United States Patent Office 2,889,897
Patented June 9, 1959

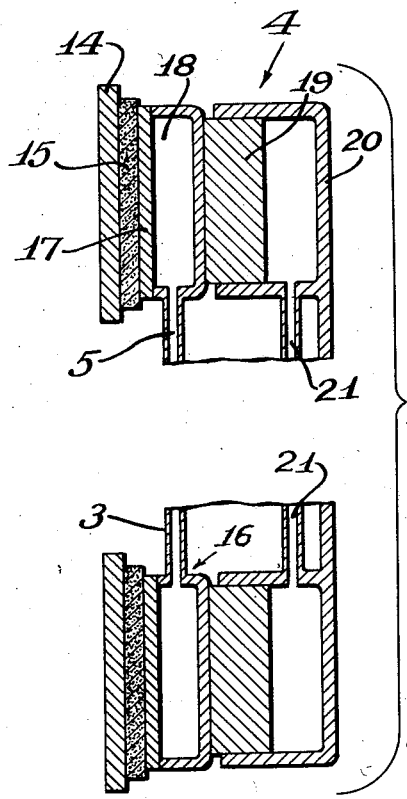

2,889,897

METHOD AND MEANS FOR COOLING FRICTION ELEMENTS

Roy S. Sanford, Woodbury, and James O. Eames, Washington, Conn., assignors to said Sanford, Wilfred A. Eaton, and Erling D. Sedergren, Woodbury, and said Eames and Roger H. Casler, Washington, Conn.

Application April 26, 1955, Serial No. 503,864

7 Claims. (Cl. 188—264)

This invention relates to improvements in a method and means of cooling friction engaging members of the liquid cooled type, that is, the type having metal brake shoes or pressure plates with which a circulating liquid coolant may be associated to prevent said shoes or plates from reaching a temperature which would be ruinous thereto.

It has heretofore been proposed to employ a liquid coolant for friction brakes wherein the coolant has been circulated in heat interchange relationship with the rear face of a metallic plate or shoe which contacts a composition friction material during friction-engaging operation to cool said plate or shoe to prevent the same from reaching temperatures which would be ruinous to both the plate or shoe and the friction material. In some instances the coolant has been brought into heat interchange relationship with the friction material instead of the metallic pressure plate or brake shoe. However, in either case the maximum capabilities of the coolant to remove the heat from the friction surfaces have not been realized. Hence, in cases where heavy loads have been encountered, that is, where high energy outputs have been generated at the friction surfaces, the disintegration of said friction surfaces has caused great and sudden "drop offs" in friction efficiency.

It has been found that liquid cooled friction elements, such as, for instance, liquid cooled brakes, permit higher energy dissipations at the braking surfaces than brakes not liquid cooled. However, a baffling phenomena has heretofore been encountered in connection with such liquid cooled brakes. It has been found that greater braking loads, that is, higher energy dissipations at the braking surfaces, could be obtained employing liquid cooling up to a predetermined maximum energy dissipation, and that thereabove, higher temperatures were encountered at the friction surfaces which caused failure of the friction elements. Yet the liquid coolant continued its circulation, but for some reason, heretofore unknown, the coolant did not adequately remove the heat from the friction elements, that is, the coolant appeared to lose its effectiveness as a cooling agent when a predetermined maximum braking load or energy dissipation was reached.

To fully appreciate the concepts of the present invention it is desirable to analyze the mechanics of friction power transmission or braking. In the usual friction mechanism, in the case of a friction clutch, there is a driving member and a driven member which are brought into mechanical engagement essentially through the agency of a friction element or elements having, in most instances, relatively high frictional coefficients. In the case of a friction brake there is a moving member and a stationary member usually interengaged by a friction element whereby the moving member is decelerated or stopped. In either case, sliding friction occurs with the resultant change of mechanical energy into heat energy. The heat thus generated, in many instances, reaches extremely high proportions and is almost instantly generated. The heat thus generated appears at the friction engaging surfaces and unless it can be removed quickly and continuously during the period of its generation, it raises the temperature at the engaging surfaces to such a degree that it is ruinous to both the friction material employed and the metallic pressure plates or brake shoes comprising the friction mechanism.

Because of the extremely short time interval involved in the generation of the heat and because of the extremely high quantity of heat generated in such a short period of time, the coolant employed, usually an aqueous solution or mixture, under conditions in which it has heretofore been used, has been unable to dissipate the heat when relatively high energy dissipations are involved.

We have found that substantially regardless of the volume of coolant adjacent the rear face of the brake shoe or pressure plate, only that thin lamina or plane of incremental thickness of the coolant immediately adjacent and in plane-parallel relationship to the rear face of the pressure plate or brake shoe is effective in carrying away the heat developed at the pressure plate or brake shoe. This is probably due to the low heat conductivity of the coolant itself, the heat conductivity being so low that in the short time intervals involved the heat cannot be transferred from the relatively thin lamina adjacent the rear face of the pressure plate or brake shoe to the remaining body or volume of the coolant.

We have discovered that when high energy dissipations are encountered at the working face of the brake shoe or pressure plate, the heat developed at the rear face of the brake shoe or pressure plate becomes so high that the thin lamina or plane of incremental thickness of coolant immediately adjacent the rear face of the pressure plate or brake shoe vaporizes, even though the main body or volume of coolant passing through the brake shoe or pressure plate remains in the liquid state and below the vaporizing temperature; that such vaporization is cumulative and having once started increases at an accelerated rate; and that eventually a vapor layer appears upon the rear face of the brake shoe or pressure plate which functions as an insulating medium which prevents the main body of coolant from adequately receiving the heat from the rear face of the brake shoe or pressure plate. We have further found that this phenomena exhibits itself in a comparatively sudden rise in temperature at the friction surfaces, since the heat generated at such surfaces has then become effectively insulated from the coolant passing through the brake shoe or pressure plate. We have further found that this condition does not exhibit itself in any other fashion, since the coolant leaving the brake shoe or pressure plate still remains in liquid state and appears in all respects to be functioning as satisfactorily as before the extremely high rise in temperature at the braking surfaces has taken place.

As a feature of the present invention we contemplate pressurizing the coolant during its passage through the brake shoe or pressure plate so as to inhibit the formation of vapor along the inner surface of the pressure plate or brake shoe. Thus, the coolant, particularly that thin lamina or plane of incremental thickness of coolant which moves adjacent the rear face of the brake shoe or pressure plate can be maintained in the liquid state even though its temperature may rise. In thus inhibiting the formation of vapors adjacent the rear face of the brake shoe or pressure plate and maintaining the coolant immediately in contact with the surfaces in the liquid state, the coolant is rendered much more effective in its ability to receive heat from the brake shoe or pressure plate, and being in the liquid state it is more effective in transmitting the heat thus received to the main body or volume of coolant passing through the brake shoe or pressure plate. Hence, unexpectedly higher braking loads or energy dissipations can be secured without having the friction elements raised to temperatures which would be ruinous thereto or which would materially shorten their lives.

It is pointed out that the invention is particularly advantageous in connection with the use of liquid cooled brakes on automotive vehicles, as it permits the use of the conventional engine cooling system and the coolant therein for cooling the brakes, thus rendering it unnecessary to provide a separate heat exchanger and a separate circulating pump for the brake system. Although the temperature of the cooling liquid going from the vehicle radiator to the suction of the vehicle circulating pump varies somewhat under different conditions of operation and on different vehicles, the temperature of this liquid is quite apt to be between 160° and 180° F., which would thus be the temperature of the liquid entering the brake shoes. In the event the vehicle brakes were so designed as to absorb large amounts of energy, it is obvious that with the cooling liquid entering the brake at 160° to 180° F., and at atmospheric pressure, an extremely large volume of liquid would have to be circulated through the brakes to absorb the energy developed during braking. Otherwise the liquid, unless pressurized in accordance with the principles of the present invention, would vaporize on the inner surface of the metallic brake shoe friction element and form an insulating layer which would prevent the proper transfer of heat from the metallic element to the circulating liquid. By pressurizing the liquid at a pressure from 50 to 700 lbs., for example, as set forth herein, the boiling point of the liquid, even though the liquid is relatively hot when entering the brake shoes, is raised to such a high point as to effectively prevent the above referred to vaporization, and to accordingly maintain the coolant in the liquid phase at all times in the brake shoe, thus resulting in the most efficient operation and cooling of the brakes. Thus, by providing means for pressurizing the cooling liquid in the brake shoe, the brake shoe cooling system may be readily and efficiently combined with the conventional engine cooling system, with a resultant elimination of unnecessary parts and unnecessary weight.

In substantially all cases known, the coolant liquid in liquid cooled friction members has heretofore been employed at relatively low pressures, that is, usually only at that pressure necessary to overcome pipeline friction and move the coolant through the cooled friction member, or in some cases where the coolant liquid accomplishes the double purpose of cooling a brake shoe and comprises the hydraulic liquid for applying the brake, the coolant is usually only at that pressure necessary to apply the brake. In either case the liquid is at relatively low pressure, being below about 50 pounds per square inch, and has been pressurized, not to increase its cooling effectiveness, but to accomplish some other mechanical function.

Heretofore, in liquid cooled brakes for aircraft, for instance, an energy dissipation at the braking surfaces of about 1.0 B.t.u. per square inch per second has been considered a maximum, since above about this braking load, relatively few repeated applications of the brakes completely ruined the braking elements. By the use of the present invention, without changing the area of the engaging surfaces, without increasing the rate of flow of the coolant, or the nature of the coolant, and by keeping all other factors constant but by merely raising the pressure of the coolant in the brake shoes or pressure plates to between about 50 to 700 pounds per square inch, the energy dissipation rate may be raised to as high as about 5.5 B.t.u. per square inch per second or higher for unexpectedly high numbers of repeated brake applications wherein the application period is of exceptionally long duration and yet wear or distortion of the braking elements has been substantially negligible.

To exemplify the use of the present invention reference will be made to the accompanying drawings which show, diagrammatically a typical braking system in which the present method may be used.

In the drawing:

Fig. 1 is a diagrammatic view showing a braking system upon which the present method may be used.

Fig. 2 is a diagrammatic view of a brake shoe associated with a composition friction material whereat the heat of braking is generated and absorbed.

Referring in detail to the drawing, 1 indicates a pump shown as being driven by an electric motor 2. The pump is preferably a positive displacement pump and in general will have a capacity proportional to the desired energy absorption at the braking surfaces. For instance, if designed for a relatively low energy absorption rate of 1.0 B.t.u. per square inch per second, the minimum capacity of pump 1 may be about .08 gallon per second. If the energy absorption rate is 5.5 B.t.u. per square inch per second, a minimum pump capacity of about .39 gallon per second would be desirable, where in both cases the input temperature of the coolant is constant at about 112° F. Of course, the required capacity of pump 1 would change where the input liquid temperature changes. For example, if the temperature of the liquid at the input of the brake were 180° F. a greater flow would be required and, hence, a greater pump capacity, and, conversely if the liquid temperature were lowered to 70° F. a lesser flow, and, hence, a lower pump capacity would be sufficient.

Of course, the pump capacity figures hereinbefore set forth are given only for purposes of example and are not intended to be limiting. For aircraft use, however, it is usually desirable to consider pump capacities in terms of minimums because of the obvious desire to use as small size and weight auxiliary equipment as possible.

The pump 1 although shown as being driven by a separate electric motor 2, may be driven by the internal combustion engine which drives the vehicle which carries the brakes to be cooled.

The outlet of pump 1 may connect into a pipe or conduit 3 which, in turn, connects into a liquid cooled brake 4. The outlet side of the brake 4 may connect into pipe 5 controlled by valve 6. On the opposite side of valve 6, said valve may connect into heat exchanger, condenser, or radiator 7, the device 7 comprising essentially a coil 8 carried within a housing 10, the housing having inlet and outlet pipes 11 and 12, respectively, which may be connected to a source of cooling liquid (not shown). The opposite end of coil 8 may be connected by pipe 13 to the inlet of pump 1. Coil 8 at its upper end may connect with a vent pipe 14 which may maintain the side of the system between valve 6 and the inlet of the pump 1 at approximately atmospheric pressure.

In carrying out the method of the present invention the heat exchanger 7 may comprise the radiator of the internal combustion engine which drives the vehicle or the heat exchanger 7 may comprise a separate unit, the housing of which may be connected to the radiator of the internal combustion engine by pipes 11 and 12. In other words, the liquid coolant system for the brake 4 may comprise a portion of the cooling system of the internal combustion engine which drives the vehicle or said system may comprise a separate system.

In addition, the liquid coolant for the brake may comprise a portion of the hydraulic system for actuating the brakes or the brakes may be actuated hydraulically or mechanically by separate means. In all events, however, the liquid coolant will be under relatively high pressures and the pump 1 will be of sufficiently high capacity to produce a desired degree of flow at the high pressure used.

For purposes of illustration, Fig. 2 shows diagrammatically the essential working parts of the liquid cooled brake 4. The brake shown is of the hydraulic type, that is wherein the friction members are urged together to make friction contact under hydraulic pressure. For purposes of simplification the hydraulic system for actuating the brake is shown as being separate from the liquid cooling system for the brake. However, in so far as the present invention is concerned it is immaterial by what actuating means the friction members are brought into pressure contact with each other.

Referring particularly to Fig. 2, 14 comprises a moving portion of the device which carries the brakes, such as the wheel of an automotive or aircraft vehicle. A ring or friction element 15 is secured to the rotating member 14 by any conventional means such as by adhesive, rivets or the like. The ring 15 may be constructed of the usual composition material having a relatively high coefficient of friction as an asbestos-binder composition or the like.

In juxtaposition with respect to the friction ring 15 is a brake shoe 16. The brake shoe is annular in shape and comprises a friction element 17 which, when the brake is applied, makes surface contact with the outer face of the ring 15. The brake shoe is of hollow construction, having an annular liquid compartment 18 through which a liquid coolant is adapted to circulate, the liquid being introduced through inlet pipe 3 and discharged through outlet pipe 5.

For purposes of applying the brake, the shoe 16 may also comprise an annular piston 19 which slidably moves in an annular cylinder 20. The brake shoe 16 and cylinder 20 comprises a stationary portion of the vehicle and fluid pressure may be established in the cylinder 20 by the introduction of fluid under pressure thereinto through pipes 21, which later may be connected to a control cylinder or controlled source of fluid under pressure (not shown), for applying the brakes.

As will be noted, unlike conventional braking systems wherein the friction material is carried by the brake shoe and coacts with a metal brake drum or disc, the brake shoe in the instant system as a friction element or plate 17 which has relatively high conductive properties. Thus, heat generated at the contact surfaces of the material 15 and plate 17 is readily conducted through the thickness of the plate 17 and transferred to the liquid coolant circulated through the space 18.

In the application of the brake 4, when fluid under pressure is introduced into the cylinder 20, the brake shoe is urged toward the rotating member 14 and sliding contact takes place at the contact faces of the friction material 15 and the plate 17. Heat is thus generated at the contact faces of the elements thereby raising the temperature of said elements. Inasmuch as the material 15 is a relatively poor heat conductor the heat may be withdrawn from this situs most efficiently through plate 17, which has relatively high heat conducting properties. However, the heat thus generated and passed through the plate must be removed or the temperature of the plate and the temperature of the friction material will reach such heights as to be ruinous of both the plate and the friction material.

Therefore, a liquid coolant is circulated through the space 18 in contact with the rear face of the plate 17. Heat, of course, continues to be generated but a major portion of the heat is removed from the plate by the coolant, and hence, in a properly designed brake, the temperature at the situs of heat generation is maintained below a predetermined safe value. With an aqueous coolant it has been found that with a circulation of about .08 gallon per second for a brake of 64 square inches contact area with coolant at an average temperature of 112° F. entering the space 18, a limiting heat generation rate of about 1.0 B.t.u. per square inch per second may be employed. Such a rate is limiting in the sense that after a few applications of the brake, the friction elements would begin to deteriorate if a greater braking load were encountered. This limiting value was, however, reached when the coolant pressure was maintained under about 50 pounds per square inch.

Of course, where the braking load is such that about 1.0 B.t.u. per square inch per second is never exceeded, such a system may operate satisfactorily with relatively low pressure coolant. However, where the braking load is increased and the heat generation rate reaches such proportions that the rate of about 1.0 B.t.u. per square inch per second is exceeded, the heat accumulates and thus the temperature rises at the friction surfaces to ruinous values. This is primarily due to the formation of vapor at the rear face of the plate 17, and thus the main body of coolant in the space 18 is virtually insulated from the rear face of the plate. Plate temperatures abruptly rise and effective braking rapidly diminishes.

A number of expedients may then be employed to cure the situation. For instance, the contact area between material 15 and plate 17 may be made larger; the volume of coolant may be increased and within limits, the rate of flow of the coolant may be increased. Where the contact area of the friction material 15 and plate 17 is increased, a larger, heavier brake results adding undesirable weight and bulk to the brake structure and the vehicle which carries it. Where a greater volume of coolant is used, the coolant can be brought into the space 18 at a lower average temperature and hence a greater rate of cooling will be obtained. However, a greater volume of coolant implies greater weight and bulk which is disadvantageous, particularly for aircraft use. When an increase in the rate of flow of the coolant is resorted to it requires greater external cooling facilities, since the coolant must be cooled during the shorter period of time it takes to pass through the condenser or heat exchanger. This, of course, requires greater weight and bulk to be carried by the vehicle. In addition, other factors limit the maximum rate of coolant flow which may be employed, such as the shortening of the time in which the coolant is in contact with the rear face of the plate 17; frictional resistance in the pipe lines, etc.

As a most important feature of the present invention, it has been found that the heat generation rate, that is, the braking load, may be increased materially and the heat transfer rate through the plate 17 may be raised substantially, using the same volume of coolant, the same rate of flow of the coolant, and the same area of contact of the friction material 15 and plate 17, by raising the pressure of the coolant. By raising the pressure of the coolant its boiling point is raised and, hence, the formation of bubbles, vapor or steam at the rear surface of the plate 17 is inhibited. Thus, all factors being equal and without any substantial increase in weight or bulk, a brake capable of handling a greater braking load is obtained.

For example, employing an aqueous coolant it has been found that with a circulation of .08 gallon per second for a brake having the same predetermined contact area as in the example hereinbefore given; with the coolant entering the space 18 at an average temperature of about 112° F., the permissible heat transfer rate of 1.0 B.t.u. per square inch per second, when coolant pressure was at about 50 pounds per square inch, could be raised to between about 3.1 to 3.9 B.t.u. per square inch per second when a coolant pressure of 700 pounds per square inch was employed. Thus the total braking load can be raised to between about 310 to 390 percent without substantially changing the weight or bulk of the brake equipment.

By reference to Fig. 1 it will be noted that by the restriction of valve 6, pipes 3 and 5 and brake 4 will constitute a high pressure side of the system, and heat exchanger 7, including coil 8 and pipe 13, will constitute a low pressure side of the system. When, for instance, the valve 6 has been so manipulated as to produce a pressure of 700 pounds per square inch in the high pressure side of the system, depending upon the brake load, the temperature of the coolant in the high pressure system at valve 6 may be as high as about 500° F. The coolant is thus superheated and hence, upon passing through valve 6 to atmospheric pressure some of the coolant will flash into vapor. Thus, the heat exchanger is essentially a condenser wherein vapor or steam at atmospheric pressure is changed to liquid at atmospheric pressure and the resulting and residual liquid lowered to a predetermined temperature.

If desired, vacuum may be drawn upon the heat exchanger whereby the high pressure coolant may exhaust from valve 6 into a zone maintained below atmospheric pressure. Thus, a greater proportion of the coolant will flash into vapor and more efficient cooling will take place in the heat exchanger.

Of course, the mere maintenance of high coolant pressure in the brake 4 does not render the present system advantageous. For instance, a static liquid pressure of 700 pounds per square inch in the brake or an inadequate flow of high pressure coolant through the brake would not effectively cool the brake. The coolant must, of course, circulate through the brake in adequate amount, the minimum circulation depending upon the temperature of the coolant entering the brake and the energy dissipation desired at the braking surfaces. For instance, with an aqueous coolant and with the coolant pressure at 700 pounds per square inch and with a brake area of 64 square inches and with the coolant temperature entering the brake at 112° F., a minimum coolant flow of about .39 gallon per second could dissipate about 5.5 B.t.u. per square inch per second at the braking surfaces. Of course, if the coolant temperature entering the brake were reduced the circulation rate of the coolant could be reduced, or with the same rate of coolant flow with a reduction of coolant temperature entering the brake, a greater amount of energy could be dissipated at the brake surfaces.

Thus, in finding that braking effectiveness falls off rapidly when vapor is locally generated at the rear face of the pressure plate or brake shoe, thus forming an insulating film on the rear face of the pressure plate or brake shoe which prevents efficient transfer of heat from said plate or shoe to the coolant, the important factor of coolant pressure has been identified. For instance, in the example hereinbefore set forth where coolant pressure was 50 pounds per square inch and the coolant temperature entering the brake was 112° F., the boiling point of the aqueous coolant was about 281° F., and hence, the maximum temperature rise is the difference between 281° F. and 112° F. or 169° F. before vaporizing occurs and its resulting insulating effect is produced. When the coolant pressure was raised to 700 pounds per square inch, the entering coolant temperature being the same, the maximum permissible temperature rise was 391° F., being the difference between 503° F., the boiling point of the coolant at 700 pounds per square inch pressure, and 112° F., the coolant entering temperature. Maintaining all other factors equal, this accounted, and has been hereinbefore brought out, for an increased energy absorption rate of between 2.1 and 2.91 B.t.u. per square inch per second at the braking surfaces.

Hence, it can be seen that where high coolant pressures are employed for a predetermined braking load, coolant volume, rate of coolant circulation, or initial coolant temperature, may be advantageously changed to effect an overall reduction in weight and bulk of the brake equipment not obtainable when low coolant pressures are employed, or for the same coolant volume, coolant flow, and coolant entering temperature, greater permissible energy dissipation, that is, braking load, is obtained.

In the apparatus shown and described for carrying out the present invention a two-pressure system is set forth. This system has many advantages, but as such is not essential to securing the advantages of the present invention. For instance, the valve 6 may be removed or maintained in completely open position and the vent pipe 14 may be controlled by a safety valve (not shown), the system being pressurized from an outside source not shown. In this case the entire system will be maintained at substantially the same pressure, neglecting, of course, frictional resistance of the coolant through the system. Thus, the coolant pressure in the brake may be maintained in the range of 50 to 700 pounds per square inch in the same fashion as hereinbefore described, and the advantages inherent in the use of such high pressures will obtain whether a portion of the return system is controlled by a valve 6 or not. In using a single pressure system, as when valve 6 is completely open or eliminated entirely, the coolant temperature when entering the brake could conceivably be relatively high. However, in all cases it is desirable to maintain the coolant entering temperature as low as possible commensurate with a desired minimum weight and bulk of the system, particularly the external cooling portion of the system.

Water, because of its relatively high specific heat and high heat of vaporization, comprises an excellent coolant for the purposes of the present invention. However, in view of the fact that one of the most advantageous uses of the present invention resides in its employment with aircraft, the coolant employed must in most instances be such that it will not freeze under normal aircraft usage. Hence, additives are frequently employed to depress the freezing point of the coolant, and in some instances, such additives also raise or lower the boiling point of the coolant. However, in all cases the use of superatmospheric pressures upon the coolant as contemplated herein, is advantageous over the use of relatively lower coolant pressures.

For instance, ethylene glycol may be added to the water coolant to depress the freezing point of the coolant. Ethylene glycol, although it has a boiling point at atmospheric pressure in excess of that of water, has a lower specific heat and a lower heat of vaporization than water, and hence, its use alone would not be as advantageous for purposes of the present invention as is water. However, when mixed with water in desired proportions, the mixture can be so proportioned that the freezing point of the coolant may be desirably depressed and yet advantage may be taken of the high specific heat and high heat of vaporization of the water.

For instance, using a coolant comprising 50 percent ethylene glycol and 50 percent water and a flow of .39 gallon per second, it was possible with a coolant pressure of 700 pounds per square inch to absorb about 5.5 B.t.u. per square inch per second before a breakdown point was reached. Employing water alone as the coolant substantially the same energy absorption rate was reached under the same conditions.

Substantially the same condition holds true for other known conventional additives. However, in general an aqueous coolant is contemplated, either water alone or in admixture with other material which might be employed to depress the freezing point of the coolant. Also, in general the present invention finds its greatest use where relatively high energy absorption rates are desired and wherein coolant pressures of from about 50 to 700 pounds per square inch effectively permit such higher energy absorption rates. For instance, employing coolant pressures in excess of 50 pounds per square inch, energy absorption rates in excess of 1.0 B.t.u. per square inch per second have been repeated far in excess of one hundred repetitions, wherein for each repetition the energy absorption rate was maintained for at least 12 seconds. For a brake of comparable area employing coolant pressures under 50 pounds per square inch and with the same energy absorption rate maintained for periods of equal duration, the friction elements completely failed after a comparatively few repetitions.

To take the fullest advantage of the benefits of the present invention the pressure plate 17 is preferably constructed of copper or siliver and is made as thin as is commensurate with the structural forces required under loads intended to be accommodated. The plate 17 may be constructed of steel or other metal but the fullest advantages of the present invention cannot be realized with such other metals.

In general, where the energy absorption rate exceeds that at which the formation of vapor would be suppressed at the inner face of the pressure plate or brake shoe at about 700 pounds per square inch coolant pressure, it has been found that the coolant temperature is so high that the temperature gradient becomes too low through the pressure plate or brake shoe to prevent the working face thereof from reaching the state of plasticity employing brake-engaging materials presently known. Hence, for practical purposes to use coolant pressures above about 700 pounds per square inch is not accompanied by those beneficial results which are obtainable through the preferred coolant pressure range between 50 and 700 pounds per square inch.

We claim as our invention:

1. In a method of cooling friction engaging members of the type having a hollow friction member with a metallic friction element adapted to contact a composition friction material having a lower heat conductivity than that of said metallic friction element to effect sliding friction engagement, the steps which comprise introducing a cooling liquid to said hollow friction member and continuously circulating it therethrough in contact with the rear face of said metallic friction element at a rate to remove heat from said rear face caused by the sliding friction, and maintaining said circulating liquid at a superatmospheric pressure in said friction member in substantially liquid phase at a pressure of between about 50 and 700 pounds per square inch adjacent the rear face of the friction element when the friction load is such as to cause vaporization of the liquid adjacent the rear face of the friction element in the friction member in the absence of said superatmospheric pressure.

2. In a method of cooling friction brakes of the type having a hollow brake shoe with a metallic braking portion adapted to contact a composition friction material to effect a braking operation, the steps which comprise introducing a cooling liquid including water to said hollow shoe and continuously circulating it therethrough in contact with the rear face of said metallic braking portion at a rate to remove heat from said rear face caused by the braking load, and maintaining said circulating liquid at a superatmospheric pressure of between about 50 and 700 pounds per square inch in said brake shoe to maintain the circulating liquid in the brake shoe adjacent the rear face of the braking portion in substantially liquid phase and inhibit the formation of vapor thereat where the braking load is such as to cause vaporization of the liquid adjacent the rear face of the braking portion in the brake shoe in the absence of said superatmospheric pressure.

3. In a method of cooling friction brakes of the type having a hollow brake shoe with a metallic braking portion adapted to contact a composition friction material having a lower heat conductivity than that of said metallic braking portion to effect a braking operation, the steps which comprise introducing a cooling liquid to said hollow shoe and continuously circulating it therethrough in heat interchanging contacting relationship with the rear face of said metallic braking portion at a rate to remove heat from said rear face caused by the braking load, maintaining said circulating liquid at a superatmospheric pressure of between about 50 and 700 pounds per square inch in said brake shoe to maintain the circulating liquid in the brake shoe in substantially liquid phase and inhibit the formation of a vapor layer adjacent the rear face of the braking portion when the braking load is such as to cause boiling of the liquid adjacent the rear face of the braking portion and the formation of an insulating vapor layer thereat in the brake shoe in the absence of said superatmospheric pressure, passing the heated liquid from the brake shoe, and then cooling said liquid and recirculating it to said brake shoe as a continuous operation.

4. In a method of cooling friction brakes of the type having a hollow brake shoe with a metallic braking portion adapted to contact a composition friction material having a lower heat conductivity than that of said metallic braking portion to effect a braking operation, the steps which comprise introducing a cooling liquid to said hollow shoe and continuously circulating it therethrough in heat interchange contact with the rear face of said metallic braking portion at a rate to remove heat from said rear face caused by the braking load, maintaining said circulating liquid at a superatmospheric pressure of between about 50 to 700 pounds per square inch in said brake shoe to maintain the circulating liquid in the brake shoe in substantially liquid phase when the braking load is such as to cause boiling of the liquid adjacent the rear face of the braking portion in the brake shoe in the absence of said superatmospheric pressure, passing the heated liquid from the brake shoe, then reducing the pressure on said liquid, cooling said liquid, and then recirculating said cooled liquid under increased pressure to said brake shoe at a continuous operation.

5. In a method of cooling friction engaging members of the type having a hollow friction member with a metallic friction portion adapted to contact a composition friction material having a lower heat conductivity than that of said metallic friction surface to effect sliding friction engagement therewith, the steps which comprise introducing a cooling liquid to said hollow friction member and continuously circulating it therethrough in contact with the rear face of said metallic friction portion at a rate to remove heat from said rear face caused by the sliding friction, and maintaining said circulating liquid at a superatmospheric pressure of between about 50 and 700 pounds per square inch in said hollow friction member, and correlating the pressure of said circulating liquid in said friction member with the rate of generation of heat due to the sliding friction to maintain the circulating liquid adjacent the rear face of the friction surface in substantially liquid phase and prevent the formation of a vapor film adjacent said rear face of the friction portion of the friction member.

6. In the method of cooling the brakes of a motor vehicle having hollow friction brake shoes with hot liquid from the vehicle engine liquid cooling system, the steps which comprise forcibly circulating said hot liquid from said cooling system through the brake shoes and back to said system during a brake application, and pressurizing said hot liquid in the hollow brake shoes at a pressure of between about 50 and 700 pounds per square inch to maintain the liquid therein in a liquid phase.

7. In a method of cooling a hollow friction member having a metallic friction portion adapted to slidably engage the surface of another friction member, the steps which comprise forcibly circulating a cooling liquid through said hollow friction member in contact with the rear surface of said metallic friction portion, and pressurizing said liquid in said hollow friction member at a pressure of about between 50 and 700 pounds per square inch to maintain the liquid therein in a liquid phase.

(References on following page)

References Cited in the file of this patent

UNITED STATES PATENTS

| | | | |
|---|---|---|---|
| 464,949 | Alden | Dec. 15, | 1891 |
| 1,874,624 | Rice et al. | Aug. 30, | 1932 |
| 2,051,286 | Boykin | Aug. 18, | 1936 |
| 2,127,557 | Ells | Aug. 23, | 1938 |
| 2,152,489 | Lamb | Mar. 28, | 1939 |
| 2,226,457 | Whittingham | Dec. 24, | 1940 |
| 2,299,208 | Bloss | Oct. 20, | 1942 |
| 2,406,304 | Levy | Aug. 20, | 1946 |
| 2,471,858 | Bloomfield | May 31, | 1949 |

FOREIGN PATENTS

| | | | |
|---|---|---|---|
| 701,725 | Great Britain | Dec. 30, | 1953 |